United States Patent Office 3,260,733
Patented July 12, 1966

3,260,733
1β-METHYL STEROIDS
Theodore J. Foell, King of Prussia, and Leland L. Smith, Malvern, Pa., assignors to American Home Products Corporation, New York, N.Y., a corporation of Delaware
No Drawing. Filed June 25, 1964, Ser. No. 378,045
5 Claims. (Cl. 260—397.3)

This invention relates to new 1β-methyl steroids and to the method by which they are prepared.

In our copending application Serial No. 373,519, filed June 8, 1964, we disclosed and claimed, among other compounds, new 1α-hydroxy-5α-androstane ketones of the following formula:

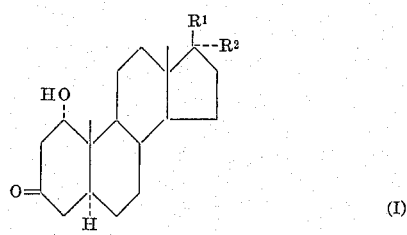

wherein $R^1$ is selected from the group consisting of OH and lower acyloxy; $R^2$ is selected from the group consisting of H, lower alkyl, lower alkenyl and lower alkynyl and $R^1$ and $R^2$ taken together are =O (keto). As described in the application referred to, these new steroids are prepared from known starting materials, namely $\Delta^1$-androstane-3-ones. In preparing compounds encompassed within Formula I, the identified starting material, $\Delta^1$-androstene-3,17-dione, is epoxidized by known and conventional technique to produce a 1α,2α-epoxyandrostan-3-one which is in turn ketalized to provide a 3,17-bisketal. The latter compound on reduction with lithium aluminum hydride yields a 1α-hydroxy compound which on hydrolysis produces the desired 1α-hydroxy-5α-3,17-dione. Initiating the described reaction with other suitable 17-mono and di-substituted starting materials (such as wherein $R^1$ is OH and $R^2$ is H, lower alkyl, lower alkenyl or lower alkynyl) provides those compounds encompassed within Formula I above. It is of course understood that treatment of such a final compound wherein $R^1$ is OH with conventional acylating agents such as acetic anhydride will result in the described acylated product as defined by (I) above.

In the foregoing, by lower alkyl is meant a hydrocarbon chain of up to 5 carbon atoms such as methyl, ethyl, propyl, butyl and amyl. Alkenyl is intended to include ethenyl, propenyl, and butenyl. Alkynyl includes such radicals as ethynyl, propynyl and the like.

It has now been found quite unexpectedly, according to the present invention, that if a compound of the type defined by Formula I above is treated with an N-(2-halo-1,1,2-trifluoroethyl)dialkylamine, a rearrangement is effected in the A and B rings of Formula I thus providing a new series of compounds, those encompassed within the following structural formula:

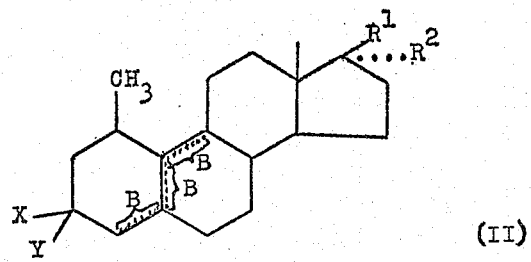

wherein $R^1$ and $R^2$ have the values ascribed in Formula I; X is selected from the group consisting of hydroxy and lower acyloxy, Y is hydrogen and X and Y taken together are =O (keto) and B is a double bond position selected from the group consisting of $\Delta^4$-, $\Delta^{5(10)}$- and $\Delta^9$-. These new compounds possess unexpected and valuable biological activity. In particular, these new compounds possess properties making them valuable and useful as androgenic and progestational agents.

Reference now to the representative reaction sequence which follows will provide a better understanding of the new compounds of the present invention and the manner in which they are prepared:

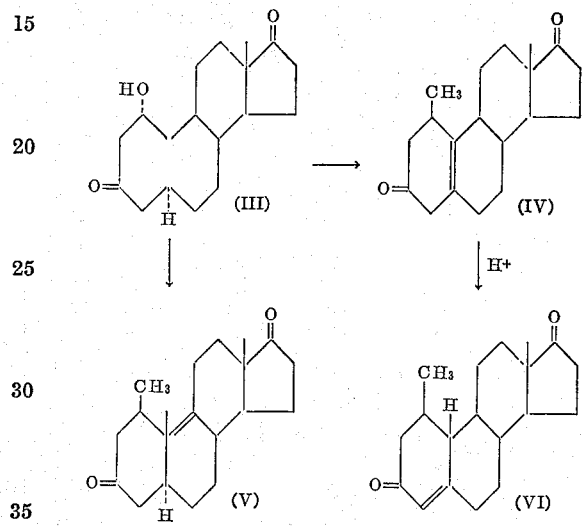

According to the foregoing reaction, 1α-hydroxy-5α-androstane-3,17-dione (III) is treated with N-(2-chloro-1,1,2-trifluoroethyl)diethylamine in the presence of a suitable solvent such as methylene chloride yielding a mixture of the 1β-steroids, 1β-methylestr-5(10)-ene-3,17-dione (IV) and 1β-methyl-5α-estr-9-ene-3,17-dione (V) and traces of 1β-methylestr-4-ene-3,17-dione (VI). The former, i.e. (IV), on treatment with acid also provides the 1β-methylestr-4-ene-3,17-dione (VI). There are thus obtained three isomeric 1β-methyl steroids. Treatment of such compounds according to standard or known procedures will in turn lead to further novel and valuable compounds. For example, it is possible, as is shown in the following representation reaction sequence:

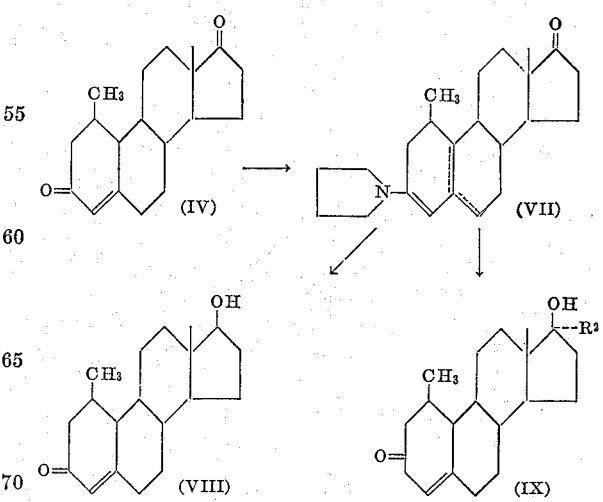

to react each of the compounds, i.e. IV, V, and VI in the manner shown above with a blocking agent such as pyrrolidine to provide a series of enamine intermediates (e.g. VII above) which in turn may be reduced to 17β-hydroxy derivatives, e.g. 17β - hydroxy-1β - methylestr-5(10)-en-3-one (VIII). Alternatively, the enamine derivative VII may be reacted with a suitable Grignard reagent or lithium alkyl reagent to yield a 17α-substituted derivative (IX). It is of course possible to react such compounds, i.e. IV, V and VI, by other known reactions without utilizing the blocking agent as shown or using other selective blocking agents as the enol ethers or enol esters, to obtain additional new and novel compounds. Such compounds, i.e. those derived in the manner suggested from starting materials of the types encompassed within IV, V and VI having appropriate substitution at the 17β-position at $R^1$ and $R^2$ as described above, in themselves possess valuable biological properties.

In the foregoing reaction sequences which are directed to specific compounds and specific reaction steps, it is of course understood that these are representative of the general class of compounds encompassed within the present invention as defined by Formula II and the reaction steps utilized in producing the same.

As has been previously suggested, the new compounds of the present invention, namely those encompassed within Formula II above, are useful for their androgenic properties. When using these new compounds for purposes of hormonal therapy, they may be administered with a pharmaceutically acceptable, organic or inorganic, solid or liquid carrier suitable for enteral or parenteral administration. For making up the preparation, there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or other known carriers for medicaments. The pharmaceutical preparations may be in the solid form, for example as capsules, tablets, dragees and the like, or in liquid form, for example, as solutions, suspensions, emulsions and the like. They may also contain auxiliary substances, such as preserving, stabilizing, wetting, emulsifying agents and the like, salts for varying the osmotic pressure, buffers, etc.

Reference now to the examples which follow will provide a better understanding of the new compounds of the present invention and the manner in which they are prepared.

*Example I*

A solution of 2.2 g. of 1α-hydroxy-5α-androstane-3,17-dione in 25 ml. of methylene chloride and 2.2 ml. of N-(2-chloro-1,1,2-trifluoroethyl)diethylamine is refluxed for 15 min., after which time thin-layer chromatography indicates that no substrate remains. The solution is washed with water, sodium bicarbonate solution, and water again, dried with anhydrous sodium sulfate, and evaporated to an oil consisting of an approximately equal mixture of 1β-methylestr-5(10)ene-3,17-dione and 1β-methyl-5α-estr-9-ene-3,17-dione. The product is chromatographed on 200 g. of silica gel prepared in benzene. Elution with 5% ethyl acetate in benzene gives an oil from which by crystallization from benzene there is recovered 463 mg. of crystals, M.P. 136° C., and 261 mg. of crystals, M.P. 125–130° C. Further elution of the column with 5% ethyl acetate in benzene gives 44 mg. of impure products, M.P. 117–123° C. Recrystallization from benzene-hexane of the 136° C. melting fraction gives 257 mg. of the pure $\Delta^{5(10)}$-product (IV), M.P. 139–140° C.; $[\alpha]_D$ +346.5°, $\lambda_{max}$ no selective absorption;

$\lambda^{KBr}_{max}$ 5.75, 5.81μ etc.

*Analysis.*—Calcd. for $C_{19}H_{26}O_2$: C, 79.68; H, 9.15. Found: C, 79.42, 79.91; H, 9.09, 9.23.

*Example II*

A solution of 150 mg. of a 1:1 mixture of 1β-methylestr-5(10)-ene-3,17-dione and 1β-methylestr-9-ene-3,17-dione in 4 ml. of methanol and 0.25 ml. of concentrated hydrochloric acid is stirred under nitrogen for two hours. The solution is neutralized with sodium bicarbonate, diluted with water, and extracted with chloroform. The chloroform extract is washed with water, dried over anhydrous magnesium sulfate, and evaporated under vacuum. The resultant oil is chromatographed on six thin-layer chromatoplates using hexane-ethyl acetate (1:1), and the more polar, ultraviolet light absorbing zone is eluted with acetone. The residue thus obtained is recrystallized from acetone-hexane, yielding 53.0 mg. of the $\Delta^4$-3-ketone product (VI), M.P. 148–149° C.; $[\alpha]_D$ —11.2°; $\lambda_{max}$ 244 mμ (ε 15,640);

$\lambda^{KBr}_{max}$ 5.75, 6.02, 6.16μ, etc.

*Analysis.*—Calcd. for $C_{19}H_{26}O_2$: C, 79.68; H, 9.15. Found: C, 79.52; H, 8.87.

Elution of the more mobile zone (detected with phosphoric acid spray on select outer edges of the chromatoplates) with acetone gives 41.1 mg. of $\Delta^9$-product (V), M.P. 124–126° C. Recrystallization from aqueous methanol gives the pure sample, M.P. 124.5–125.0° C.; $[\alpha]_D$ +316° C.; $\lambda_{max}$ no selective absorption;

$\lambda^{KBr}_{max}$ 5.74, 5.80μ, etc.

*Analysis.*—Calcd. for $C_{19}H_{26}O_2$: C, 79.68; H, 9.15. Found: C, 79.28; H, 9.09.

*Example III*

A solution of 647 mg. of 1β-methylestr-9-ene-3,17-dione in 14 ml. of benzene is treated with 0.4 ml. of pyrrolidine and a crystal of p-toluenesulfonic acid monohydrate. The mixture is refluxed with continuous removal of water (under a Dean-Stark apparatus) for 7.5 hr., at which time the solvents are removed under vacuum. The enamine product is recovered from benzene-hexane, yielding 445 mg. The entire preparation is dissolved in 10 ml. of benzene and added to a stirred suspension of 450 mg. of lithium aluminum hydride in 60 ml. of ether. The mixture is refluxed 5 minutes, cooled, water added and evaporated under vacuum. The crude product mixture is dissolved in 10 ml. of 95% ethanol, refluxed for five minutes and the solvents removed under vacuum. Thin-layer chromatography of the preparation indicates three components. The mixture is extracted with chloroform. The chloroform extract is washed with dilute hydrochloric acid and with water, dried over anhydrous magnesium sulfate, and evaporated under vacuum. The product is chromatographed on 40 g. of silica gel. Elution with ethyl acetate:hexane (1:9) gives a homogeneous product which is recrystallized from acetone-hexane to give 100 mg. of 17β-hydroxy-1β-methylestr-9-ene-3-one, M.P. 185–186° C.; $[\alpha]_D$ +226.8°;

$\lambda^{KBr}_{max}$ 2.9μ, 5.85μ, etc.

*Analysis.*—Calcd. for $C_{19}H_{28}O_2$: C, 79.12; H, 9.79. Found: C, 79.21; H, 9.76.

From the mother liquor an additional 50 mg. of product, M.P. 180–182° C., is obtained.

*Example IV*

Continued elution of the column chromatogram described in Example III using ethyl acetate-hexane (1:9) yields 1β-methylestr-9-ene-3,17β-diol which is crystallized from acetone-hexane, 34.3 mg., M.P. 170–196° C., $\lambda^{KBr}_{max}$ 3.07μ, etc.

*Analysis.*—Calcd. for $C_{19}H_{30}O \cdot \frac{1}{2}C_6H_{14}$: C, 79.22; H, 11.18. Found: C, 79.17; H, 11.15.

*Example V*

A solution of 250 mg. of 1β-methylestr-4-ene-3,17-dione in 4 ml. of absolute ethanol containing 40 mg. of sodium borohydride (under nitrogen) is refluxed and stirred for 2 hours, after which 0.3 ml. of 50% aqueous acetic acid is added, followed by water and chloroform. The chloroform extract is dried over anhydrous magnesium sulfate, evaporated under reduced pressure, and the solid product, 1β-methylestr-4-ene-3,17-diol, thereby recovered.

*Example VI*

The product from Example V is dissolved in 3 ml. of dioxane and treated with 250 mg. of dicyanodichloroquinone at room temperature for 16 hr. The reaction mixture is filtered, the solids washed with methylene chloride, and the combined filtrate and washes evaporated under vacuum. The crude product is dissolved in 50 ml. of methylene chloride, washed with water until neutral, dried over anhydrous sodium sulfate and evaporated under vacuum. The resultant product is 17β-hydroxy-1β-methylestr-4-en-3-one.

*Example VII*

The product of Example VI is dissolved in 3 ml. of pyridine containing 1.0 ml. of acetic anhydride, and the solution held at room temperature overnight. The solvents are then removed under vacuum, toluene added, and the mixture again reduced in volume under vacuum. The product is chromatographed on 12 g. of silica gel, and elution with ethyl acetate-hexane (1:19) affords the desired product, 17β-acetoxy-1β-methylestr-4-en-3-one, (108 mg.) which is recrystallized from acetone-hexane to yield the pure ester, M.P. 129–131° C.; $\lambda_{max}$. 246 mμ (ε 13,600);

$\lambda_{max}^{KBr}$. 5.77μ, 5.96μ, 6.14μ, etc.

*Analysis.*—Calcd. for $C_{21}H_{30}O_3$: C, 76.32; H, 9.15. Found: C, 76.62; H, 9.37.

*Example VIII*

The 3,17-diol product of Example V is dissolved in 10 ml. pyridine and 3 ml. of acetic anhydride added. The solution is held at room temperature for 18 hr. after which time the solvents are removed under vacuum. The residue thereby obtained is dissolved in acetone, and hexane added until cloudiness results. The mixture is chilled, and the pure crystalline 3,17-diacetate derivative (1β-methylestr-4-ene-3,17-diol-3,17 - diacetate) recovered by filtration.

*Example IX*

A solution of 100 mg. of 1β-methylestr-5(10)-ene-3,17-dione in 20 ml. of ethanol is refluxed with the calculated amount of sodium borohydride for 3 hr. The mixture is then treated with 5 ml. of 50% aqueous acetic acid, diluted with water, and the products extracted with chloroform. The chloroform extract is dried and evaporated; yielding the desired 1β-methylestr-5(10)-ene-3,17-diol product. The pure product is obtained by recrystallization from acetone-hexane.

*Example X*

To a solution of 1β-methylestr-4-ene-3,17-dione (400 mg.) in 2.1 ml. of peroxide-free dioxane there is added 0.43 ml. of ethyl orthoformate and 0.36 ml. of a solution of 0.244 g. of p-toluene-sulfonic acid monohydrate in 2.7 ml. of dioxane and 0.55 ml. of absolute ethanol. The mixture is stirred at room temperature for 1 hr., at which time pyridine is added, and the solvents removed under vacuum, yielding the desired crude enol ether product, 3-ethoxy-1β-methylestra-3,5-dien-17-one.

*Example XI*

The intermediate 3-enol ether obtained in Example X is dissolved in benzene and added slowly to a well stirred solution of ten equivalents of methyl magnesium bromide in dry ether. The mixture is refluxed under nitrogen for five hours. The reaction mixture is then poured onto ice. The mixture is acidified with hydrochloric acid, and the product recovered by extraction of the ice water mixture with ether. The ether extract is dried over anhydrous sodium sulfate and evaporated under vacuum, yielding 17β-hydroxy-1β,17α-dimethylestr-4-en-3-one as the 3-enol ethyl ether. This product is dissolved in 20 ml. of methanol (under nitrogen) and 3.5 ml. of 0.2 N hydrochloric acid is added. After stirring overnight the solution is neutralized with sodium bicarbonate, the product extracted with chloroform, and the dried chloroform extract evaporated under vacuum, yielding the desired product 17β-hydroxy-1β,17α-dimethylestr-4-en-3-one.

*Example XII*

The 3-enol ethyl ether prepared according to Example X is dissolved in redistilled dimethylacetamide under acetylene. The solution is stirred vigorously and a solution containing two equivalents of lithium acetylide-ethylenediamine complex (as a suspension in dioxane) and an equal volume of dimethylacetamide added. The mixture is stirred for two hours, poured on to ice, extracted with benzene, and the benzene extracts washed with water and dried. After evaporation under vacuum, a crude 17α-ethynyl derivative is obtained which is hydrolyzed with methanolic hydrochloric acid after the manner of Example XI. The crystalline product thereby obtained is recrystallized from acetone-hexane to yield pure 17α-ethynyl-17β-hydroxy-1β-methylestr-4-en-3-one.

While the foregoing invention has been described in the specific examples set forth with some degree of particularity, it is to be understood that the invention is not be limited thereby but is only to be limited by the claims appended hereto.

The invention claimed is:

1. A compound having the formula:

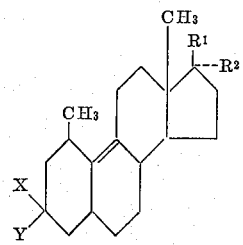

wherein $R^1$ is selected from the group consisting of hydroxy and lower acyloxy; $R^2$ is selected from the group consisting of hydrogen, lower alkyl, lower alkenyl and lower alkynyl and $R^1$ and $R^2$ taken together are keto; X is selected from the group consisting of hydroxy and lower acyloxy; Y is hydrogen and X and Y taken together are keto.

2. 1β-methyl-5α-estr-9-ene-3,17-dione.
3. 17β-hydroxy-1β-methylestr-9-en-3-one.
4. 1β-methylestr-9-ene-3,17β-diol.
5. The method which comprises reacting a compound having the formula:

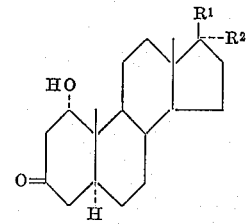

wherein $R^1$ is selected from the group consisting of OH and lower acyloxy; $R^2$ is selected from the group consisting of H, lower alkyl, lower alkenyl and lower alkynyl; $R^1$ and $R^2$ taken together are =O (keto) with a N-(2- halo-1,1,2-trifluoroethyl)dialkylamine to produce a compound having the formula:

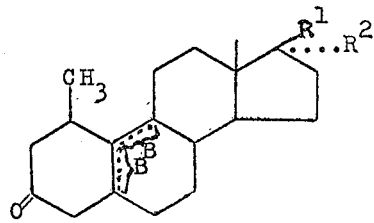

wherein $R^1$ is selected from the group consisting of OH and lower acyloxy; $R^2$ is selected from the group consisting of H, lower alkyl, lower alkenyl and lower alkynyl; $R^1$ and $R^2$ taken together are =O (keto) and B is a double bond position selected from the group consisting of $\Delta^{5(10)}$- and $\Delta^9$-.

References Cited by the Examiner
UNITED STATES PATENTS
2,918,481   12/1959   Ringold et al. _____ 260—397.4

OTHER REFERENCES

Gardi et al.: Gazz, Chim. Ital. 95, pp. 1503–19, p. 1510 relied on (1963).

Ringold et al.: J.A.C.S. 78, pp. 2477–9 (1956).

LEWIS GOTTS, *Primary Examiner.*

HENRY A. FRENCH, *Assistant Examiner.*